United States Patent
Sobanski et al.

(10) Patent No.: US 11,655,758 B1
(45) Date of Patent: May 23, 2023

(54) CMC VANE MATE FACE FLANGES WITH THROUGH-PLY SEAL SLOTS

(71) Applicant: RAYTHEON TECHNOLOGIES CORPORATION, Farmington, CT (US)

(72) Inventors: Jon Erik Sobanski, Glastonbury, CT (US); Howard J. Liles, Newington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/709,523

(22) Filed: Mar. 31, 2022

(51) Int. Cl.
| | |
|---|---|
| F02C 7/28 | (2006.01) |
| F02C 3/06 | (2006.01) |
| F01D 9/04 | (2006.01) |

(52) U.S. Cl.
CPC ............... F02C 3/06 (2013.01); F01D 9/041 (2013.01); F02C 7/28 (2013.01); F05D 2220/32 (2013.01); F05D 2240/35 (2013.01); F05D 2240/55 (2013.01); F05D 2300/614 (2013.01)

(58) Field of Classification Search
CPC ...... F02C 3/06; F02C 7/28; F01D 9/04; F01D 9/041; F01D 9/047; F01D 11/005; F05D 2220/32; F05D 2240/35; F05D 2240/55; F05D 2300/614; F05D 2300/6033
See application file for complete search history.

(56) References Cited

U.S. PATENT DOCUMENTS

| 9,759,078 B2 | 9/2017 | Farah et al. | |
|---|---|---|---|
| 10,072,516 B2 | 9/2018 | Carr et al. | |
| 2002/0044868 A1* | 4/2002 | Marx | F01D 9/041 |
| | | | 415/191 |
| 2016/0069199 A1* | 3/2016 | Duelm | F01D 25/246 |
| | | | 415/209.3 |
| 2016/0084096 A1* | 3/2016 | Carr | F02C 3/04 |
| | | | 415/208.1 |
| 2021/0102469 A1 | 4/2021 | Sobanski et al. | |

FOREIGN PATENT DOCUMENTS

EP  3767075 A1 * 1/2021 ............ F01D 11/003

* cited by examiner

*Primary Examiner* — Steven M Sutherland
(74) *Attorney, Agent, or Firm* — Carlson, Gaskey & Olds, P.C.

(57) ABSTRACT

A vane arc segment includes a platform and an airfoil section that extends in a radial direction from the platform. The airfoil section has a pressure side and a suction side. The platform defines fore and aft axial sides, a core gaspath side, a non-core gaspath side, and first and second flanges that project from the non-core gaspath side. The first and second flanges define, respectively, first and second circumferential mate faces. The first and second flanges each are formed of upturned fiber plies from the platform such that the fiber plies in the first and second flanges are radially-oriented. The first and second circumferential mate faces have, respectively, first and second seal slots that each extend in a ply through-thickness direction across two or more of the fiber plies.

20 Claims, 3 Drawing Sheets

CMC VANE MATE FACE FLANGES WITH THROUGH-PLY SEAL SLOTS

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane arc segment according to an example of the present disclosure includes a platform and an airfoil section that extends in a radial direction from the platform. The airfoil section has a pressure side and a suction side. The platform defines fore and aft axial sides, a core gaspath side, a non-core gaspath side, and first and second flanges that project from the non-core gaspath side. The first and second flanges define, respectively, first and second circumferential mate faces. The first and second flanges each are formed of upturned fiber plies from the platform such that the fiber plies in the first and second flanges are radially-oriented. The first and second circumferential mate faces have, respectively, first and second seal slots that each extend in a ply through-thickness direction across two or more of the fiber plies.

In a further embodiment of any of the foregoing embodiments, each of the first and second seal slots has a forward end that opens at the fore axial side of the platform and an aft end that opens at the aft axial side of the platform.

In a further embodiment of any of the foregoing embodiments, each of the first and second flanges has a radially outer face opposite the core gaspath side, each of the first and second flanges defines a flange radial span from the core gaspath side to the radially outer face with 0% span at the core gaspath side and 100% span at the radially outer face, and the first and second seal slots are located at greater than 50% span.

In a further embodiment of any of the foregoing embodiments, the first and second seal slots are located at greater than 60% span.

In a further embodiment of any of the foregoing embodiments, the first and second seal slots are located at greater than 70% span.

In a further embodiment of any of the foregoing embodiments, each of the first and second flanges has a radially outer face opposite the core gaspath side, the platform defines a platform thickness from the core gaspath side to the non-core gaspath side, the first and second flanges each define a flange thickness from the core gaspath side to the radially outer face, and the flange thickness is greater than the platform thickness by a factor of 2 or more.

In a further embodiment of any of the foregoing embodiments, the flange thickness is greater than the platform thickness by a factor of 2.5 or more.

In a further embodiment of any of the foregoing embodiments, the flange thickness is greater than the platform thickness by a factor of 3 or more.

In a further embodiment of any of the foregoing embodiments, the first and second seal slots each extend in the ply through-thickness direction across three or more of the fiber plies.

In a further embodiment of any of the foregoing embodiments, the first and second seal slots each terminate at an interface between two of the fiber plies.

A gas turbine engine according to an example of the present disclosure includes a compressor section, a combustor in fluid communication with the compressor section, and a turbine section in fluid communication with the combustor. The turbine section has vane arc segments as in any of the foregoing embodiments disposed in a circumferential row about a central axis of the gas turbine engine.

In a further embodiment of any of the foregoing embodiments, the first circumferential mate face of the one of the vane arc segments abuts the second circumferential mate face of the adjacent one of the vane arc segments.

In a further embodiment of any of the foregoing embodiments, each of the first and second seal slots has a forward end that opens at the fore axial side of the platform and an aft end that opens at the aft axial side of the platform.

In a further embodiment of any of the foregoing embodiments, each of the first and second flanges has a radially outer face opposite the core gaspath side, each of the first and second flanges defines a flange radial span from the core gaspath side to the radially outer face with 0% span at the core gaspath side and 100% span at the radially outer face, and the first and second seal slots are located at greater than 50% span.

In a further embodiment of any of the foregoing embodiments, the first and second seal slots are located at greater than 60% span.

In a further embodiment of any of the foregoing embodiments, each of the first and second flanges has a radially outer face opposite the core gaspath side, the platform defines a platform thickness from the core gaspath side to the non-core gaspath side, the first and second flanges each define a flange thickness from the core gaspath side to the radially outer face, and the flange thickness is greater than the platform thickness by a factor of 1.5 or more.

In a further embodiment of any of the foregoing embodiments, the flange thickness is greater than the platform thickness by a factor of 2 or more.

In a further embodiment of any of the foregoing embodiments, the flange thickness is greater than the platform thickness by a factor of 2.5 or more.

In a further embodiment of any of the foregoing embodiments, the first and second seal slots each extend in the ply through-thickness direction across three or more of the fiber plies.

In a further embodiment of any of the foregoing embodiments, the first and second seal slots each terminate at an interface between two of the fiber plies.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
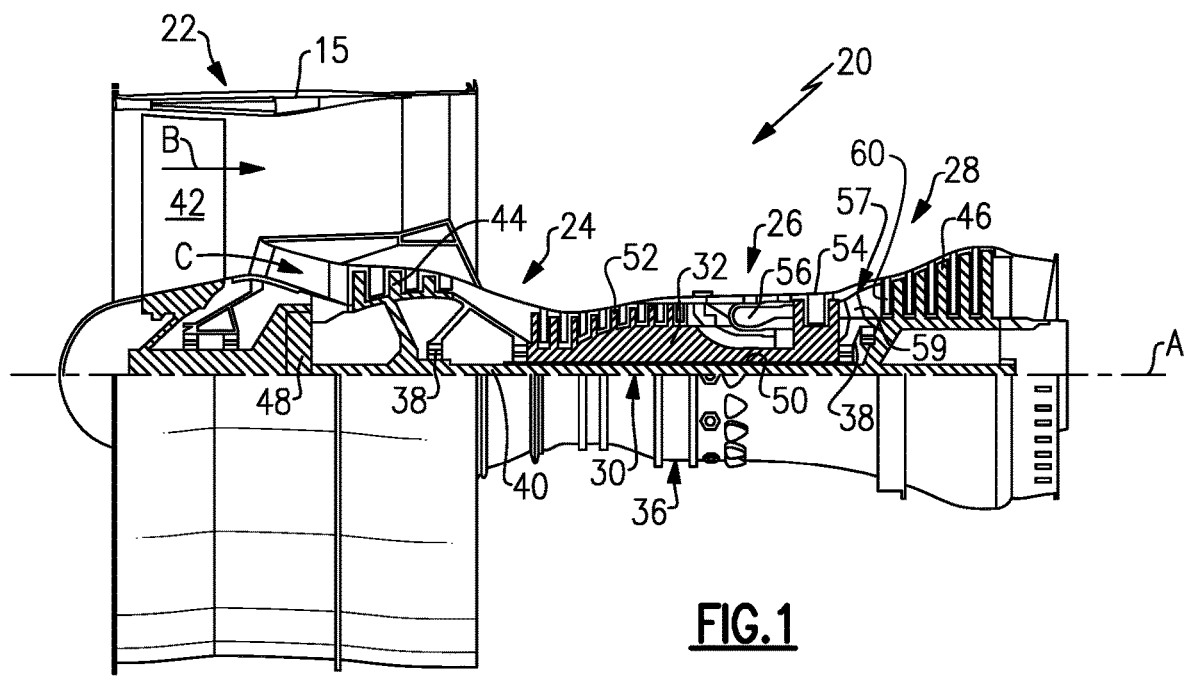
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
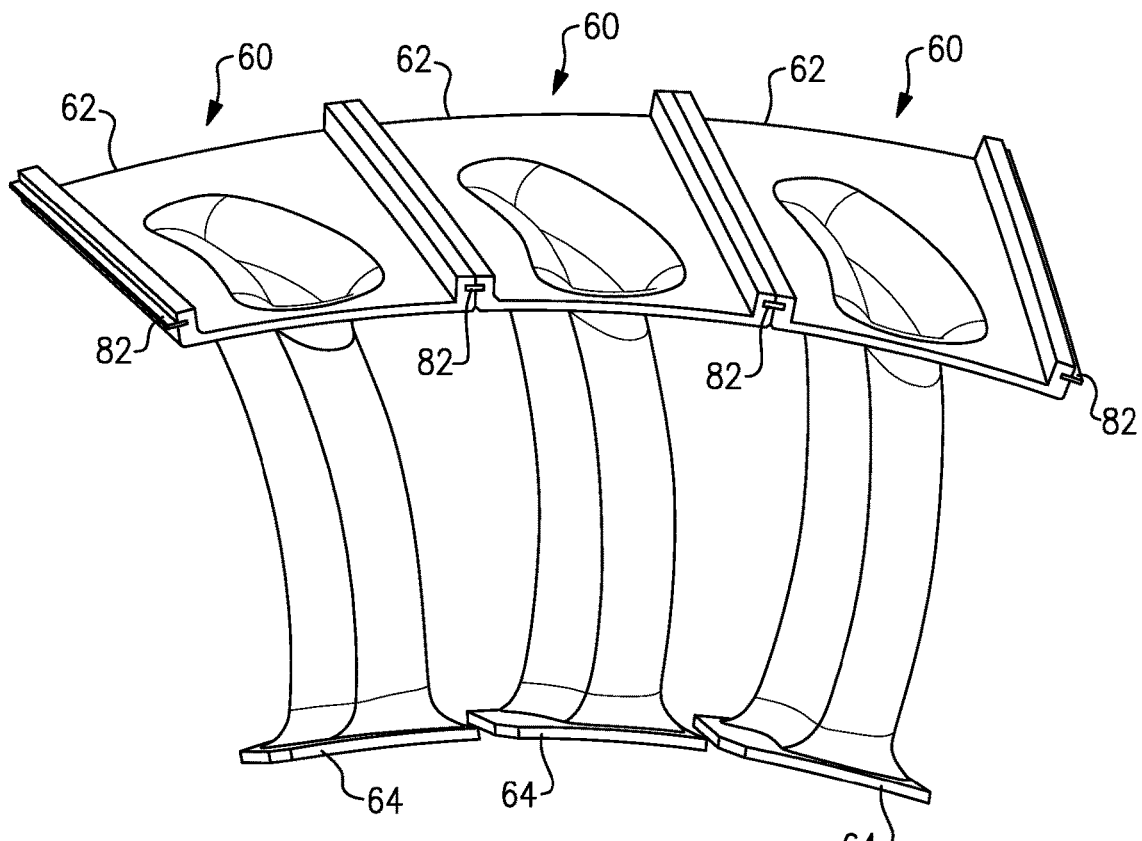
FIG. 2 illustrates a portion of a vane ring comprised of vane arc segments.
Figure 3:
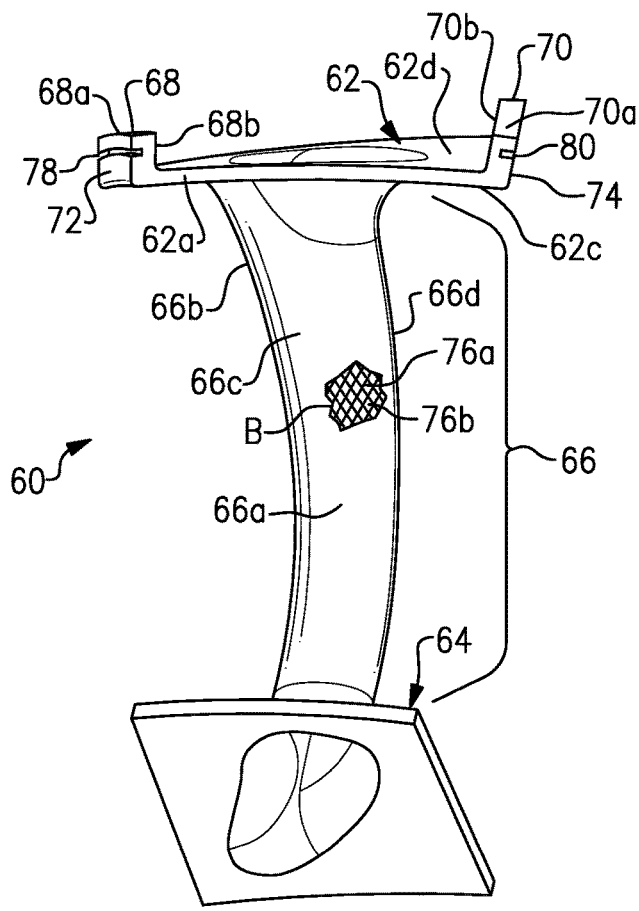
FIG. 3 illustrates an isolated view of one of the vane arc segments.

FIG. 2 illustrates a representative portion of a vane ring assembly from the turbine section 28 of the engine 20. The vane ring assembly is made up of a plurality of vane arc segments 60 that are situated in a circumferential row about the engine central axis A. FIG. 3 illustrates and isolated view of a representative one of the vane arc segments 60. Although the vane arc segments 60 are shown and described with reference to application in the turbine section 28, it is to be understood that the examples herein are also applicable to structural vanes in other sections of the engine 20.

Referring to FIG. 3, each vane arc segment 60 is a one-piece structure that is comprised of several sections, including first and second platforms 62/64 and an airfoil section 66 that extends between the platforms 62/64. The airfoil section 66 in this example is hollow and defines a leading end 66a, a trailing end 66b, and pressure and suction sides 66c/66d. In this example, the first platform 62 is a radially outer platform and the second platform 64 is a radially inner platform. It is also contemplated, however, that in modified examples the vane arc segment 60 could alternatively have the first platform 62 as a single platform, with no second platform 64, in which case the single platform may be at either the radially inner or outer end of the airfoil section 66. Terms such as "inner" and "outer" used herein refer to location with respect to the central engine axis A, i.e., radially inner or radially outer. Moreover, the terminology "first" and "second" used herein is to differentiate that there are two architecturally distinct components or features. It is to be further understood that the terms "first" and "second" are interchangeable in that a first component or feature could alternatively be termed as the second component or feature, and vice versa.

Figure 4:
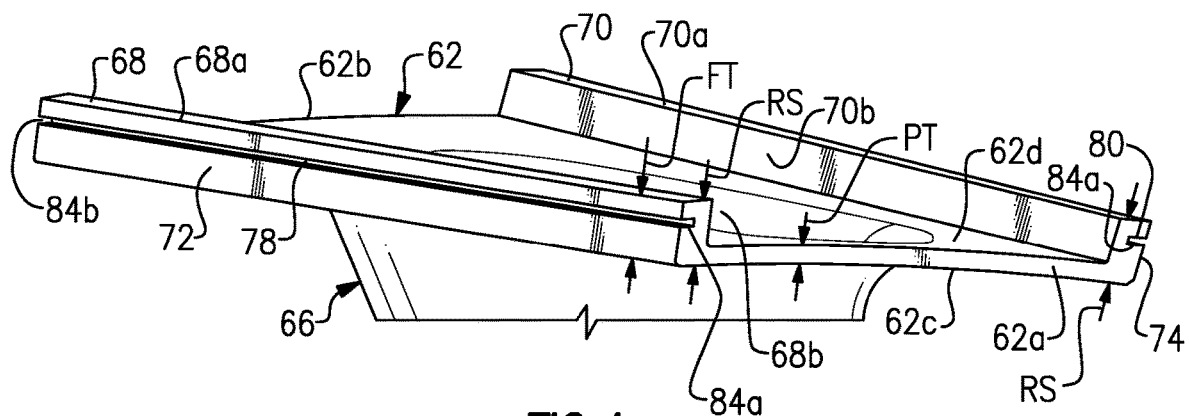
FIG. 4 illustrates a platform of a vane arc segment.

FIG. 4 illustrates a view of the first platform 62. The first platform 62 includes fore and aft axial sides 62a/62b, a core gaspath side 66c, and a non-core gaspath side 66d. The platform 62 has first and second flanges 68/70 that project radially from the non-core gaspath side 66d. The flanges 68/70 define, respectively, first and second circumferential mate faces 72/74. In this example, the flanges 68/70 are exclusive in that they are the only radial projections from the non-core gaspath side of the platform 62. The flanges 68/70 are generally elongated and run along the full fore-aft extent of the platform 62. The flanges 68/70 define respective radial faces 68a/70a (here radially outer) and inside faces 68b/70b. The inside faces 68b/70b face circumferentially toward each other (i.e., toward the central region of the platform 62).

The vane arc segment 60 is continuous in that the platforms 62/64 and airfoil section 66 constitute a single, uninterrupted body. As an example, the vane arc segment 60 is formed of a ceramic matrix composite (CMC). In the illustrated example in FIG. 3, referring to cutaway section B, the CMC includes ceramic fibers 76a that are disposed in a ceramic matrix 76b. The CMC may be, but is not limited to, a SiC/SiC composite in which SiC fibers are disposed within a SiC matrix. The ceramic fibers 76a are provided in fiber plies (see FIG. 5 at 76c). The fiber plies 76c may be woven or unidirectional and may collectively include plies of different fiber weave configurations. The fiber plies 76c are continuous through at least the platform 62, including the flanges 68/70, the airfoil section 66, and the second platform 64. As shown, the fiber plies 76c are laid-up in a laminate configuration. At the edges of the platform 62, the fiber plies 76c are upturned to form the flanges 68/70. The fiber plies 76c in the flanges 68/70 are thus radially-oriented in that they lie in planes that are substantially radially-oriented.

The first and second circumferential mate faces 72/74 have, respectively, first and second seal slots 78/80 that retain a feather seal 82. A feather seal is a relatively long, narrow, thin strip of metal alloy, which under pressure can conform to a surface to provide sealing. Each of the seal slots 78/80 (see FIG. 4) has a forward end 84a that opens at the forward axial side 62a of the platform 62 and an aft end 84b that opens at the aft axial side 62b of the platform 62. The seal slots 78/80 thus extend the full distance from the axial side 62a to the axial side 62b.

In general, feather seals have been used for sealing between metallic components. However, CMC challenges the use of feather seals. For instance, the properties of CMCs substantially differ in-plane versus out-of-plane of the fiber plies, whereby a CMC is relatively strong in in-plane tension and relatively weak in interlaminar tension. The use of CMCs may thus be limited by its interlaminar properties. Additionally, due to their thermal resistance, CMCs can be used at temperatures that may exceed the operating temperature of metallic alloys, such as that of a feather seal. In these regards, as will be discussed below, the flanges 68/70 and seal slots 78/80 are adapted for use of feather seals with CMCs.

The seal slots 78/80 extend into the respective flanges 68/70 in a ply through-thickness direction, i.e., generally orthogonal to the radial direction and thus also generally orthogonal to the planes of the fiber plies 76c. Each of the seal slots 78/80 extends across two or more of the fiber plies 76c, for example across three or more plies. The seal slots 78/80 each terminate at an interface between two of the fiber plies 76c. That is, the seal slots 78/80 stop at the face of a fiber ply 76c rather than extending partially through the fiber ply 76c. Although not limited, the seal slots 78/80 may be formed by machining, such as waterjet-guided laser machining.

Figure 5:
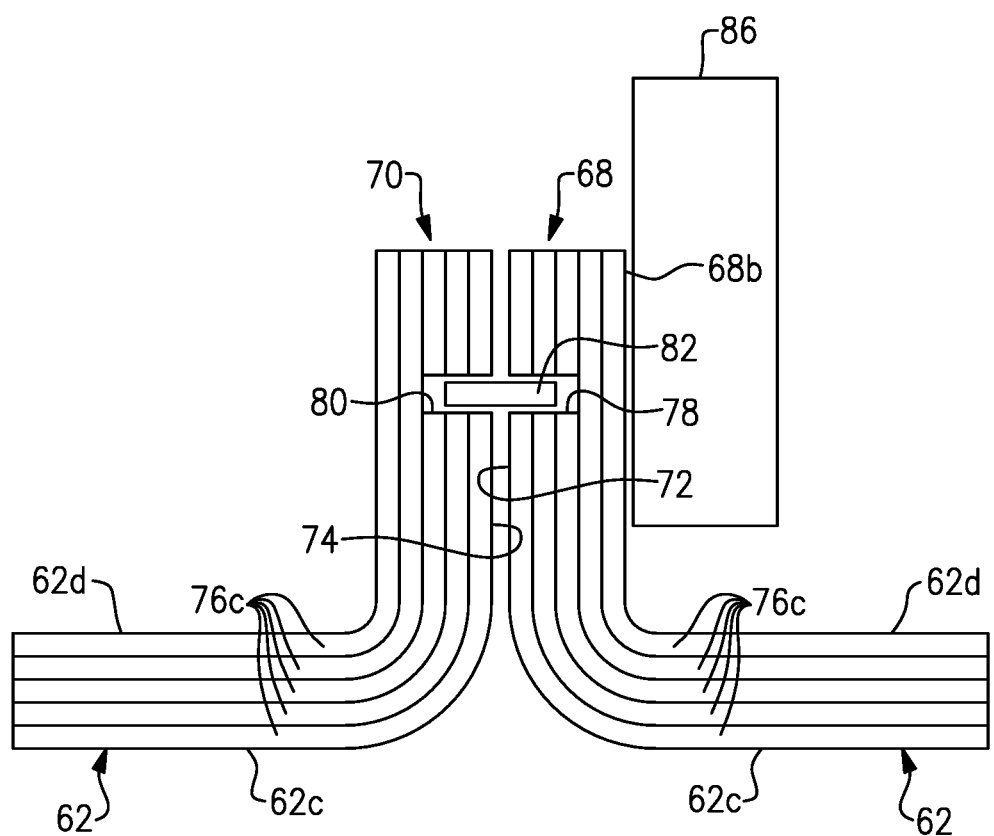
FIG. 5 illustrates portions of adjacent vane arc segments.

As shown in FIG. 5, the feather seal 82 is partially disposed in seal slot 78 and partially disposed in slot 80. The radial height and the circumferential depth of the seal slots 78/80 are larger, respectively, than the radial height and circumferential width of the feather seals 82 so that the feather seals 82 have space to shift somewhat during engine operation as the vane arc segments 60 move relative to each other. The circumferential depth of the seal slots 78/80 is selected such that the feather seals 82 are unable to fall out of the seal slots 78/80 at a condition of maximum separation between the mate faces 72/74 during engine operation.

The feather seal 82 facilitates sealing the interface between the mate faces 72/74 of adjacent vane arc segments 60 to limit leakage of gases from the core gaspath of the engine 20. For instance, the feather seal 82 is pressurized from the non-core gaspath side to contact, and thus seal against, the surfaces of the seal slots 78/80. Similar to the seal slots 78/80, the feather seal 82 extends the full distance from the axial side 62a to the axial side 62b to provide sealing along the entire interface.

The pressurized loading of the feather seals 82 against the surfaces of the seal slots 78/80 may cause radial loads through the flanges 68/70. By having the seal slots 78/80 extend across the fiber plies 76c in the through-thickness direction, the radial loads are applied in the in-plane direction, thereby avoiding interlaminar tension as discussed above. Additionally, as the seal slots 78/80 extend across several of the fiber plies, the radial loads are distributed through the ends of the fiber plies 76c over multiple fiber plies 76c.

In order to address high temperatures, the seal slots 78/80 are also offset from the core gaspath side 62c of the platform 62 so as to be closer to the radial faces 68a/70a of the flanges 68/70 than to the core gaspath side 62c. For example, each of the flanges 68/70 defines a flange radial span RS (FIG. 4) from the core gaspath side 62c to the radially outer face 68a/70a, with 0% span at the core gaspath side 62c and 100% span at the radially outer face 68a/70a. The seal slots 78/80 are located at greater than 50% span.

The CMC from which the platform 62 is formed transmits heat at the core gaspath side 62c, although it is generally a poor heat conductor in comparison to metals. Given this poor thermal conductivity, offsetting the seal slots 78/80 to be closer to the radial faces 68a/70a, even by a small amount of the radial span RS, facilitates lowering the temperature at the location of the seal slots 78/80. For instance, at flow path temperatures above 2500° C., the temperature at the seal slots 78/80 is expected to be lowered by 100° C. or more in comparison to a seal slot that is located at less than 50% span. As the thermal gradient from the core gaspath side 62*c* is expected to be high, increasingly further offsets from the core gaspath side 62*c* provide increasingly lower exposure temperatures at the seal slots 78/80. In further examples, the seal slots 78/80 are located at greater than 60% span, or at greater than 70% span.

In order to facilitate locating the seal slots 78/80 a desired distance away from the core gaspath side 62*c* given an expected thermal gradient, the flanges 68/70 are relatively thick in the radial direction as compared to the radial thickness of the platform 62. For example, the platform 62 defines a platform thickness PT (FIG. 4) from the core gaspath side 62*c* to the non-core gaspath side 62*d*, the flanges 68/70 each define a flange thickness (FT) from the core gaspath side 62*c* to the radial face 68*a*/70*a*, and the flange thickness is greater than the platform thickness by a factor of 2 or more, for example by a factor of 2.5 or more, or of 3 or more. As will be appreciated, increasing the factor enables the seal slots 78/80 to be located further away from the core gaspath side 62*c* at higher percent spans.

In addition to the feather seals 82, the circumferential mate faces 72/74 also provide sealing. As shown in FIG. 5, the mate faces 72/74 may abut one another. Such contact further limits escape of gases from the core gaspath. Furthermore, the contact also serves for transfer of aerodynamic loads and/or other loads. For instance, the inside face 68*b* of the flange 68 abuts a structural support 86. Loads are driven from flange 70 of one vane arc segment 60, into the flange 68 of the adjacent vane arc segment 60, and then into the support 86. This also serves to distribute the loads over the two flanges 68/70 rather than through a single flange, thereby enhancing durability.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane arc segment comprising:
   a platform and an airfoil section extending in a radial direction from the platform,
   the airfoil section having a pressure side and a suction side,
   the platform defining fore and aft axial sides, a core gaspath side, a non-core gaspath side, and first and second flanges projecting from the non-core gaspath side, the first and second flanges defining, respectively, first and second circumferential mate faces,
   the first and second flanges each being formed of upturned fiber plies from the platform such that the fiber plies in the first and second flanges are radially-oriented, and
   the first and second circumferential mate faces having, respectively, first and second seal slots each extending in a ply through-thickness direction across two or more of the fiber plies.

2. The vane arc segment as recited in claim 1, wherein each of the first and second seal slots has a forward end that opens at the fore axial side of the platform and an aft end that opens at the aft axial side of the platform.

3. The vane arc segment as recited in claim 1, wherein each of the first and second flanges has a radially outer face opposite the core gaspath side, each of the first and second flanges defines a flange radial span from the core gaspath side to the radially outer face with 0% span at the core gaspath side and 100% span at the radially outer face, and the first and second seal slots are located at greater than 50% span.

4. The vane arc segment as recited in claim 3, wherein the first and second seal slots are located at greater than 60% span.

5. The vane arc segment as recited in claim 3, wherein the first and second seal slots are located at greater than 70% span.

6. The vane arc segment as recited in claim 1, wherein each of the first and second flanges has a radially outer face opposite the core gaspath side, the platform defines a platform thickness from the core gaspath side to the non-core gaspath side, the first and second flanges each define a flange thickness from the core gaspath side to the radially outer face, and the flange thickness is greater than the platform thickness by a factor of 2 or more.

7. The vane arc segment as recited in claim 6, wherein the flange thickness is greater than the platform thickness by a factor of 2.5 or more.

8. The vane arc segment as recited in claim 6, wherein the flange thickness is greater than the platform thickness by a factor of 3 or more.

9. The vane arc segment as recited in claim 1, wherein the first and second seal slots each extend in the ply through-thickness direction across three or more of the fiber plies.

10. The vane arc segment as recited in claim 1, wherein the first and second seal slots each terminate at an interface between two of the fiber plies.

11. A gas turbine engine comprising:
   a compressor section;
   a combustor in fluid communication with the compressor section; and
   a turbine section in fluid communication with the combustor, the turbine section having vane arc segments disposed in a circumferential row about a central axis of the gas turbine engine, each of the vane arc segments includes:
      a platform and an airfoil section extending in a radial direction from the platform,
      the airfoil section having a pressure side and a suction side,
      the platform defining fore and aft axial sides, a core gaspath side, a non-core gaspath side, and first and second flanges projecting from the non-core gaspath side, the first and second flanges defining, respectively, first and second circumferential mate faces,
      the first and second flanges each being formed of upturned fiber plies from the platform such that the fiber plies in the first and second flanges are radially-oriented, and the first and second circumferential mate faces having, respectively, first and second seal slots each extending in a ply through-thickness direction across two or more of the fiber plies;

a plurality of feather seals, each feather seal being partially disposed in the first seal slot of one of the vane arc segments and partially disposed in the second seal slot of an adjacent one of the vane arc segments in the circumferential row.

12. The gas turbine engine as recited in claim 11, wherein the first circumferential mate face of the one of the vane arc segments abuts the second circumferential mate face of the adjacent one of the vane arc segments.

13. The gas turbine engine as recited in claim 11, wherein each of the first and second seal slots has a forward end that opens at the fore axial side of the platform and an aft end that opens at the aft axial side of the platform.

14. The gas turbine engine as recited in claim 11, wherein each of the first and second flanges has a radially outer face opposite the core gaspath side, each of the first and second flanges defines a flange radial span from the core gaspath side to the radially outer face with 0% span at the core gaspath side and 100% span at the radially outer face, and the first and second seal slots are located at greater than 50% span.

15. The gas turbine engine as recited in claim 14, wherein the first and second seal slots are located at greater than 60% span.

16. The gas turbine engine as recited in claim 11, wherein each of the first and second flanges has a radially outer face opposite the core gaspath side, the platform defines a platform thickness from the core gaspath side to the non-core gaspath side, the first and second flanges each define a flange thickness from the core gaspath side to the radially outer face, and the flange thickness is greater than the platform thickness by a factor of 1.5 or more.

17. The gas turbine engine as recited in claim 16, wherein the flange thickness is greater than the platform thickness by a factor of 2 or more.

18. The gas turbine engine as recited in claim 16, wherein the flange thickness is greater than the platform thickness by a factor of 2.5 or more.

19. The gas turbine engine as recited in claim 11, wherein the first and second seal slots each extend in the ply through-thickness direction across three or more of the fiber plies.

20. The gas turbine engine as recited in claim 11, wherein the first and second seal slots each terminate at an interface between two of the fiber plies.

* * * * *